(12) United States Patent
Yaniv et al.

(10) Patent No.: US 6,588,909 B2
(45) Date of Patent: Jul. 8, 2003

(54) SHUTTER FOR IMAGE PROJECTION SYSTEM

(75) Inventors: Zvi Yaniv, Austin, TX (US); Michael C. Sweaton, Austin, TX (US); Alexei Tikhonski, Cedar Park, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 10/198,183

(22) Filed: Jul. 18, 2002

(65) Prior Publication Data

US 2002/0186353 A1 Dec. 12, 2002

Related U.S. Application Data

(63) Continuation-in-part of application No. 09/876,400, filed on Jun. 7, 2001.

(51) Int. Cl.⁷ .............................................. G03B 21/28
(52) U.S. Cl. .............................. 353/98; 353/98; 353/99
(58) Field of Search .............................. 353/28, 79, 88; 359/443; 349/11, 12, 16

(56) References Cited

U.S. PATENT DOCUMENTS

| | | | |
|---|---|---|---|
| 3,650,608 A | * 3/1972 | Baker | 353/69 |
| 5,123,192 A | 6/1992 | Hsieh | 40/442 |
| 5,175,637 A | 12/1992 | Jones et al. | 359/48 |
| 5,416,617 A | * 5/1995 | Loiseaux et al. | 349/1 |
| 5,644,369 A | * 7/1997 | Jachimowicz et al. | 349/10 |
| 5,784,138 A | 7/1998 | Kollarits et al. | 349/93 |
| 5,813,742 A | * 9/1998 | Gold et al. | 353/88 |
| 5,940,150 A | * 8/1999 | Faris et al. | 349/16 |
| 6,092,900 A | * 7/2000 | Diedrich et al. | 353/122 |
| 6,122,023 A | * 9/2000 | Chen et al. | 349/86 |
| 6,220,711 B1 | * 4/2001 | Melville | 353/28 |
| 6,329,726 B1 | * 12/2001 | Lau et al. | 307/58 |

* cited by examiner

*Primary Examiner*—William Dowling
(74) *Attorney, Agent, or Firm*—Kelly K. Kordzik; Winstead Sechrest & Minick P.C.

(57) ABSTRACT

An image projection system comprises an image projector, such as a film or television projector and a projection screen. The projection screen is fabricated of a substantially transparent material, such as glass or plastic. The screen of transparent material has one or more areas or portions formed therein which areas or portions may be made to be translucent upon the application of a stimulus. Once in a translucent condition, the projected image can be received and viewed on the translucent portion. A mirror can be positioned behind the projection screen so that a person can view the reflection of themselves in the mirror when the screen is transparent, and an image can be projected when the projection screen is made to be substantially translucent.

3 Claims, 6 Drawing Sheets

SHUTTER FOR IMAGE PROJECTION SYSTEM

CROSS REFERENCE TO RELATED APPLICATION

The present application is a continuation-in-part of U.S. patent application Ser. No. 09/876,400 now allowed, entitled "Image Projection System" filed Jun. 7, 2001.

TECHNICAL FIELD

The present invention is generally related to the field of image projection systems.

BACKGROUND INFORMATION

In U.S. patent applications Ser. Nos. 09/519,537 and 09/876,400, an invention was disclosed whereby a substantially transparent medium could be used as a projection screen for capturing an image from an image projector. When the medium was not capturing an image from an image projector, its substantially transparent characteristic permitted persons to see through the medium. However, the system also provided an ability for the medium to capture an image from an image projector for viewing by persons. In one embodiment, the medium was made to have a characteristic that caused it to be nearly opaque, or substantially translucent (permitting the passage of light, but not sufficient as to be able to view objects clearly), so that persons could see clearly the image projected.

The present invention takes the advantages of this system to further uses.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
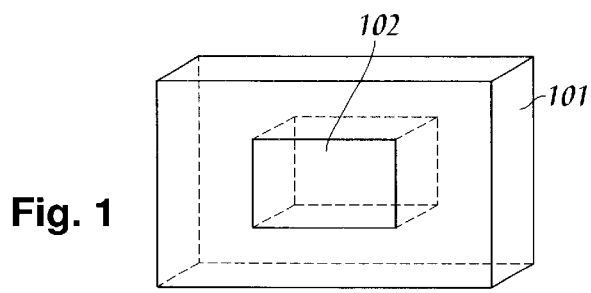
FIG. 1 illustrates a prospective view of a projection screen in accordance with the present invention.

In the following description, numerous specific details are set forth such as specific materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

While the specification concludes with claims defining the features of the invention that are regarded as novel, it is believed that the invention will be better understood from a consideration of the following description in conjunction with the drawing figures, in which like reference numerals are carried forward.

Figure 3:
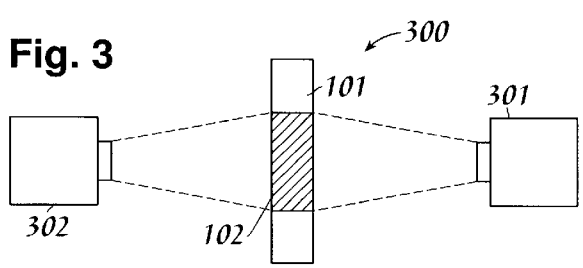
FIG. 3 is a side view of an image projection system.

Referring now to FIG. 3, there is illustrated therein a cross-sectional side view of the image projection system 300 as disclosed in U.S. patent application Ser. No. 09/876,400. The system 300 comprises a projector 301 of any type commonly used, examples of which include an LCD projector, a television projector currently used on conventional projection television systems, a film projector, a slide projector or a computer for providing computer generated images, to name but a few. The system 300 further includes a projection screen 101. However, the projection screen herein is a glass or other transparent (or semi-transparent) material, having one or more switchable portions. More particularly, the screen 101 may comprise a sheet of glass having a portion 102 or portions that can be switched between the glass' typical transparent characteristic, to a translucent appearance or condition. Projector 301 may project an image onto portion 102, which will be viewable by viewers on both sides of screen 101 when portion 102 is translucent, on the right side when it is opaque. Alternatively, when portion 102 is translucent or opaque, another projector 302 can be used to project an image onto the other side of screen 101 so that such an image is viewable by viewers on the left side of screen 101.

The invention is also applicable for projection on reflective surfaces such as mirrors.

As is readily apparent, light, as from a projected image, projected onto a sheet of glass or other transparent material leaves no readily viewable impression. This is due of course to the fact that the projected light passes substantially unimpeded through the glass. Accordingly, heretofore retail establishments, for example, having large areas of display glass windows were forced to post paper sign advertising, for example, an on-going sale. This type of advertising is neither dynamic, nor particularly effective. Conversely, an advertising scheme taking advantage of the projection system described herein has many advantages. In particular, by projecting an image onto the translucent area of the glass substrate, the projected image is visible by viewers on both sides of the glass. Moreover, while only a portion of the glass or other substrate may by switchable between the transparent and the translucent condition, the whole of the substrate may in fact be switchable. This allows a condition in which, for example, a glass pane becomes an entire wall of e.g., advertising area.

Figure 2:
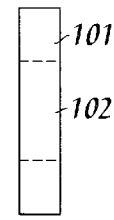
FIG. 2 illustrates a side view of the projection screen shown in FIG. 1.

Referring now to FIGS. 1 and 2, the transparent screen 101 may be a glass panel such as a display window, or some other type of transparent medium. Examples of such transparent media include various types of plastics, cast or fabricated as plastic sheets. The switchable portion 102 switches between the transparent (or semi-transparent) state, which is unsuitable for the receipt of a projected image, to a translucent or opaque state which will readily receive a projected image.

The switchable portion 102 may be provided by equipping the transparent screen 101 with an electrical, chemical or photosensitive material which is transparent in the absence of a stimulus, but switches to a translucent or opaque state upon receipt of a particular stimulus. Examples of electrochromic, photochromic, and electrophoretic materials which may be advantageously employed in this function are well known to those of ordinary skill in the art. For example, a polymer dispersed liquid crystal material as is commonly available may be sandwiched between sheets of glass or plastic in one or more portions of a transparent sheet. As oriented in the standard configuration, the molecules of liquid crystal material will allow for the passage of light there through, i.e., the portion is transparent. However, upon application of a relatively small electrical stimulus, the molecules of liquid crystal material may be made to change their orientation, thus taking on a translucent or nearly opaque appearance and making such area of the transparent sheet suitable for the receipt of a projected image. Such switchable materials are disclosed within J. W. Doane et al., *Displays from a New Type of Liquid Crystal Microdroplet Dispersion*, IEEE, 1985 International Display Research Conference, pp. 153–154 (1985); J. W. Doane et al., *Wide-Angle-View PDLC Displays*, SID 90 DIGEST, pp. 224–226 (1990); Z. Yaniv et al., *Active Matrix Polyiner Dispersed Liquid Crystal Display*, JAPAN DISPLAY, pp. 572–575 (1989), which are all incorporated by reference herein.

Alternatively, the medium 101 may be coated with a special resin called a photopolymer which is capable of refracting light in the manner of a prism. The screen is configured to polarize the incident light falling on different areas of the screen (angle of incidence at screen center may be 35°) so that it emerges from the front evenly to produce a bright and clear image with a high degree of uniformity. Thus, when the projector is off, light entering the medium in a substantially perpendicular manner will be allowed to pass through so that a person can see directly through the medium. However, if an image is projected at a specified angle to the medium, such an image is projected onto the medium for viewing. Such a projection system is available commercially from Hitachi.

Figure 4:
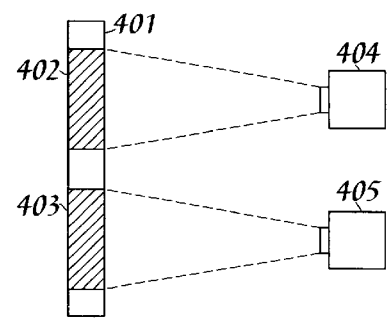
FIG. 4 illustrates an alternative embodiment of the present invention.

While FIGS. 1, 2 and 3 illustrate but a single switchable portion 102 on the transparent sheet 101, it is to be understood that the invention is not so limited. For example, and as is illustrated in FIG. 4, a plurality of image projectors 404, 405 may be used to provide a plurality of projected images onto a plurality of switchable portions 402, 403 of a transparent sheet 401 or plural sheets. Such an embodiment would have great utility in, for example, retail settings.

In yet another embodiment, two or more portions may be arranged in an overlapping relationship. This overlapping relationship may be either a situation in which two portions directly overlay one another, or partially do so. If two overlay one another completely, such a configuration may be employed to allow images to be projected in differing light conditions. For example, the first portion may be a darker translucent portion for better image quality in a first set of light conditions, while the second portion may be a lighter translucent portion adapted for a second set of light conditions. Each of the portions would of course be independently controllable.

Figure 5:
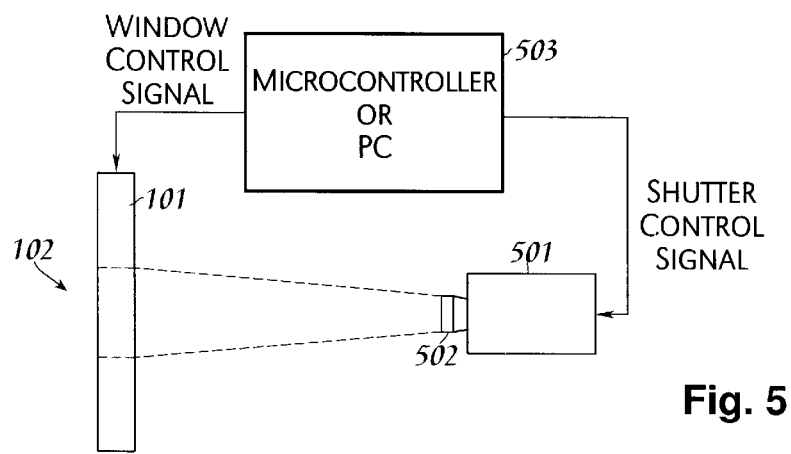
FIG. 5 illustrates an embodiment of the present invention.

Referring to FIG. 5, there is illustrated a projection system in accordance with the present invention whereby an image projector 501 is projecting an image onto portion 102 of medium 101. A microcontroller or personal computer (PC) 503 may control what images are projected by projector 501, and may control a shutter 502 so that projector 501 can remain continuously on, without having to be turned on and off, and merely provide for the projection of the image out of the projector 501 in accordance with the algorithm as described below with respect to FIG. 6. Simultaneously, when the shutter 502 is opened, the medium 101 can be made to have its portion 102 be translucent for receipt of the projected image. Furthermore, if a shutter is not used, there may be a residual leaking of light projected from the projector onto the screen, thus causing a noticeable light spot. Use of the shutter maintains a "true" black image on the screen when there is no video.

The shutter 502 can be controlled to open only when the video source is actually projecting an image. Such a video source could be a videotape, DVD, or any other source that provides a video signal. In addition, the switching of the medium from translucent to transparent and vice versa can also be made dependent upon the presence of a video signal sending video images.

Figure 8:
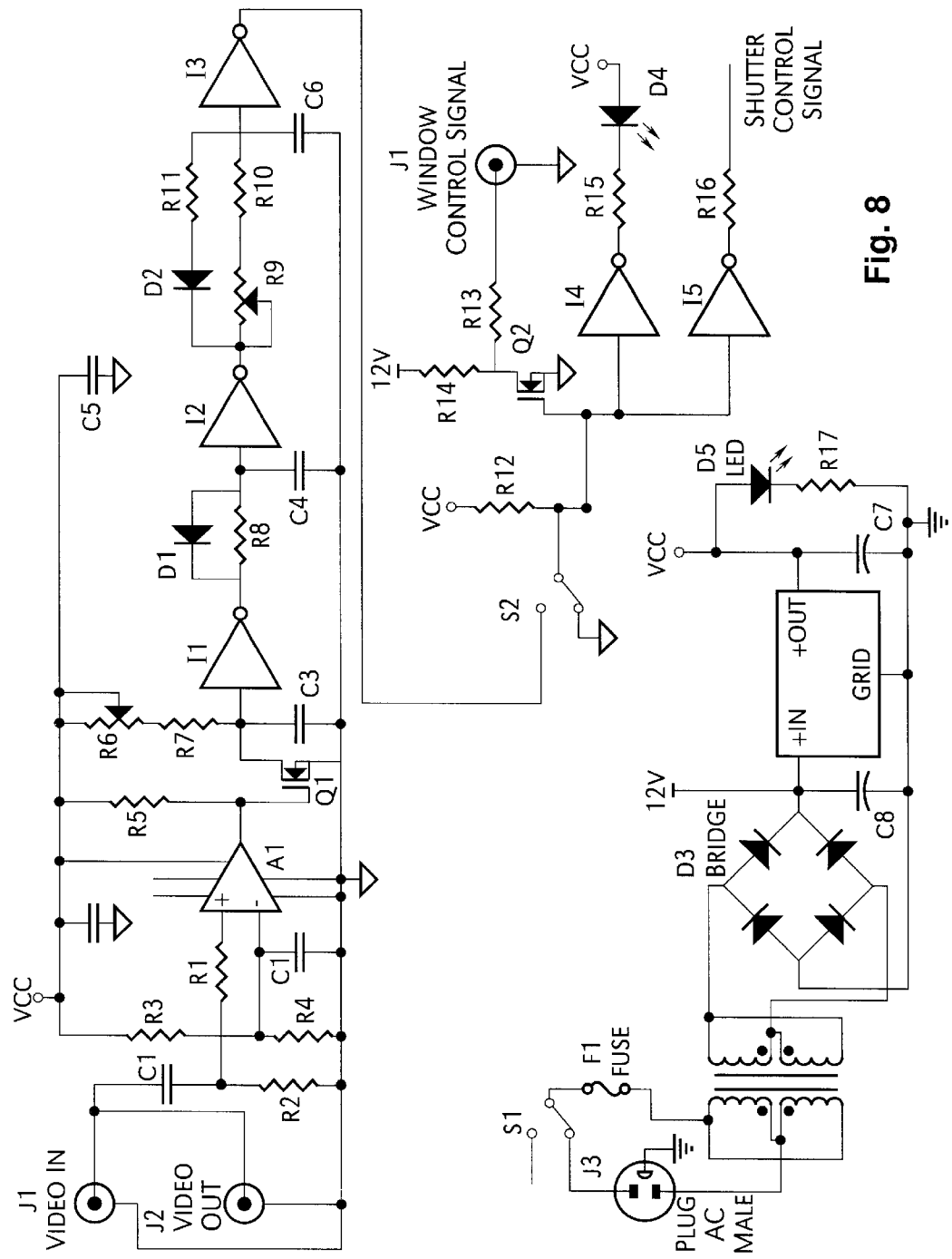
FIG. 8 illustrates a circuit diagram of a video controlled shutter.

Referring to FIG. 8, there is illustrated an embodiment of a circuit that can accomplish the foregoing. Such a circuit could be implemented anywhere within the systems described herein. Video is received at Jack J1 and looped through via jack J2. Capacitor C1 AC couples the video signal to the amplifier A1 while resistor R2 provides a DC reference. Resistors R3 and R4 are used to provide a fixed DC offset to the amplifier A1 that in turns saturates the AC signal to the power supply rails. Transistor Q1 converts the digitized AC signal while the combination of resistors R6 and R7 and capacitor C3 provide further delay to insure a more digitized AC signal. The basic function of this portion of this circuit is to provide an asserted digital signal (e.g., a high or 1 signal) when any form of an AC signal has been received at jack J1, and a negated digital signal (e.g., a low or 0 signal) when there is no AC signal (e.g., no video signal).

The combination of inverter 11, diode D1, resistor R8 and capacitor C4 provides a first past delay while inverter 11, diode D2, resistor R10, resistor R11, and capacitor C6 provide an adjustable delay for when there is a brief blank space (i.e., no video signal) imbedded within the video stream received at jack J1. This reduces false triggering of the shutter and window control signals as discussed below. Inverter 13 provides further buffering to inverters 14 and 15. Switch S2 is used to place the window control and shutter control signals in either a manual mode (i.e., window off and shutter open) or an automatic mode. An automatic mode turns the window control signal on or off and closes or opens the shutter control signal depending on whether or not a video signal has been detected. For example, when a video signal is detected at jack J1, the shutter control signal will transition to an open shutter state, and the window control signal will switch to a translucent state. Transistor Q2 is used as a high current driver for the control signals, while diode D4 is a status LED indicating when the shutter control signal is active.

The circuitry encompassing switch S1, AC male plug J3, fuse F1, the transformer, bridge, capacitors C7 and C8, resistor R17 and diode D5 function as a basic AC to DC converter used to supply overall power to the remainder of the circuitry in FIG. 8.

The circuit in FIG. 8 applies to a single video signal. For video sources with multiple video signals, such as RGB or S-video, the portion of this circuit comprising jacks J1 and J2, resistors R6 and R7 and capacitor C1 can be duplicated for the required number of multiple video sources and electrically OR'd to the remainder of the circuit.

Figure 6:
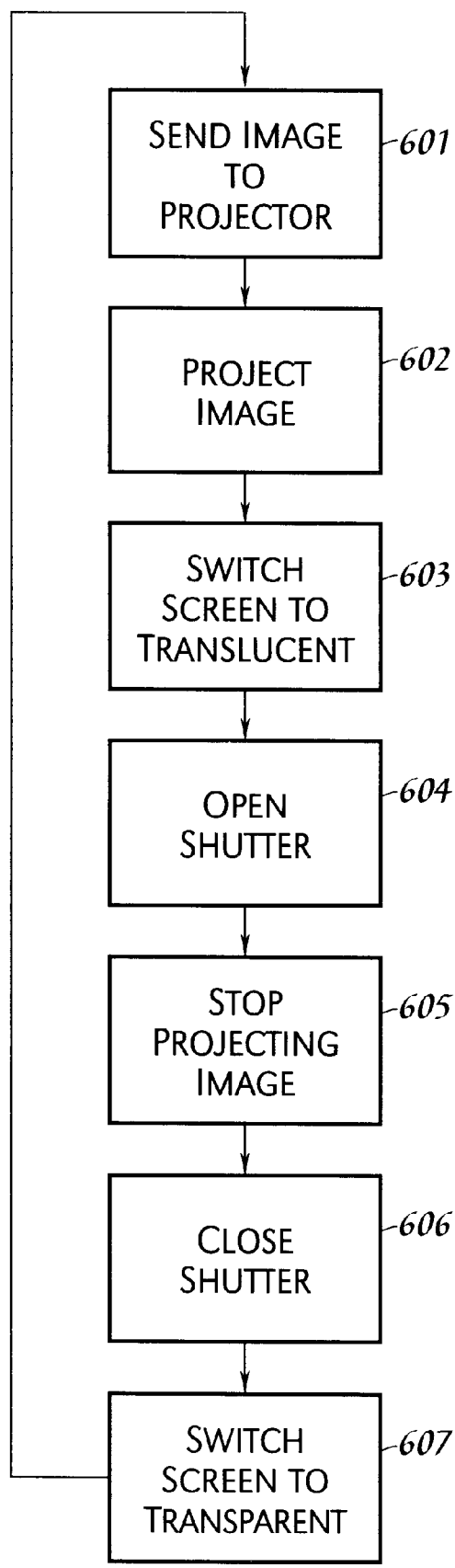
FIG. 6 illustrates a flow diagram of an embodiment of the present invention.

FIG. 6 illustrates a flow diagram of this process. In step 601, microcontroller 503 will send an image to projector 501. In step 602, the image is projected by projector 501. In step 603, substantially simultaneously with the opening of the shutter in step 604 the portion 102 is transformed (optionally, in response to the window control signal from circuit 800) to a translucent state for receipt of the projected image. In step 604, shutter 502 is opened by circuit 800 using the shutter control signal. The sequence of steps 602, 603 and 604 can be interchangeable. For example, the process could first switch the screen to a translucent state, then open the shutter, and then project the image. At a later time, in step 606 the shutter 502 will be closed in response to circuit 800 stopping projection 606 of the image (step 605). Substantially simultaneously with step 606 portion 102 of screen 101 will be switched to a transparent state (optionally, in response to circuit 800). In a manner similarly as described above, steps 605, 606 and 607 are interchangeable.

Figure 7A:
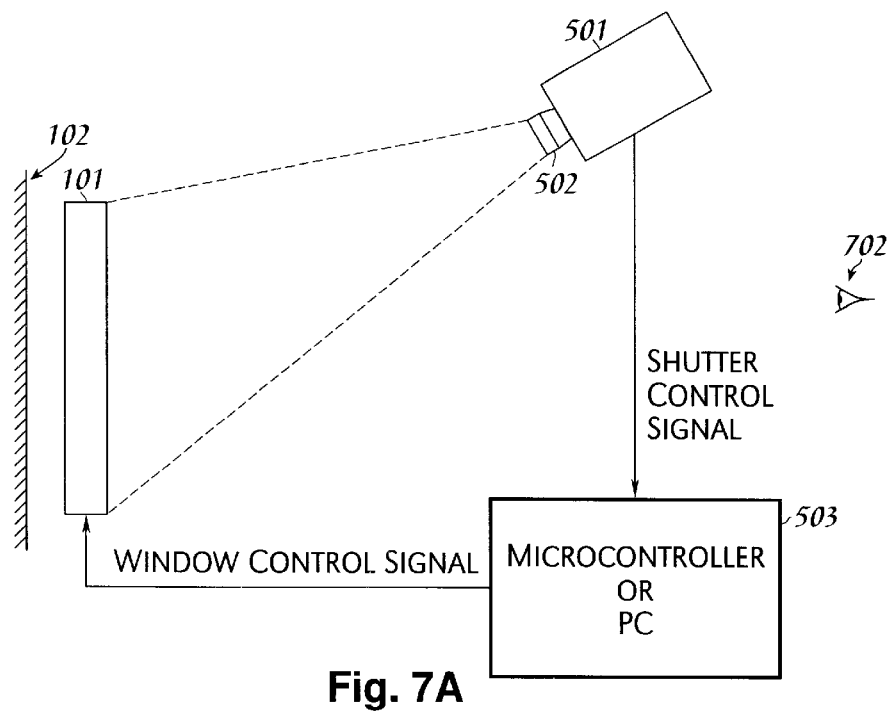
FIGS. 7A–7E illustrate alternative embodiments of the present invention.

Referring to FIG. 7A, there is illustrated an alternative embodiment of the present invention where screen 101 is placed in front of a mirror 701 shown in sideview. As a result, when screen 101 is in a transparent state, viewer 702 will see a reflection of the viewer. When screen 101 is placed in a translucent state and shutter 502 is opened to allow projection of an image from projector 501, viewer 702 will see the projected image onto screen 101.

Figure 7B:
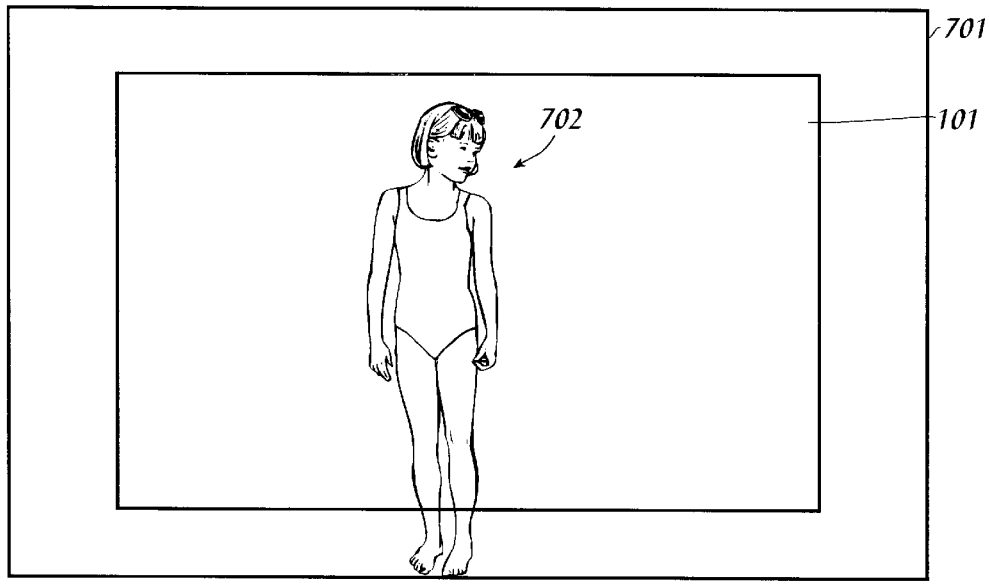
Figure 7C:
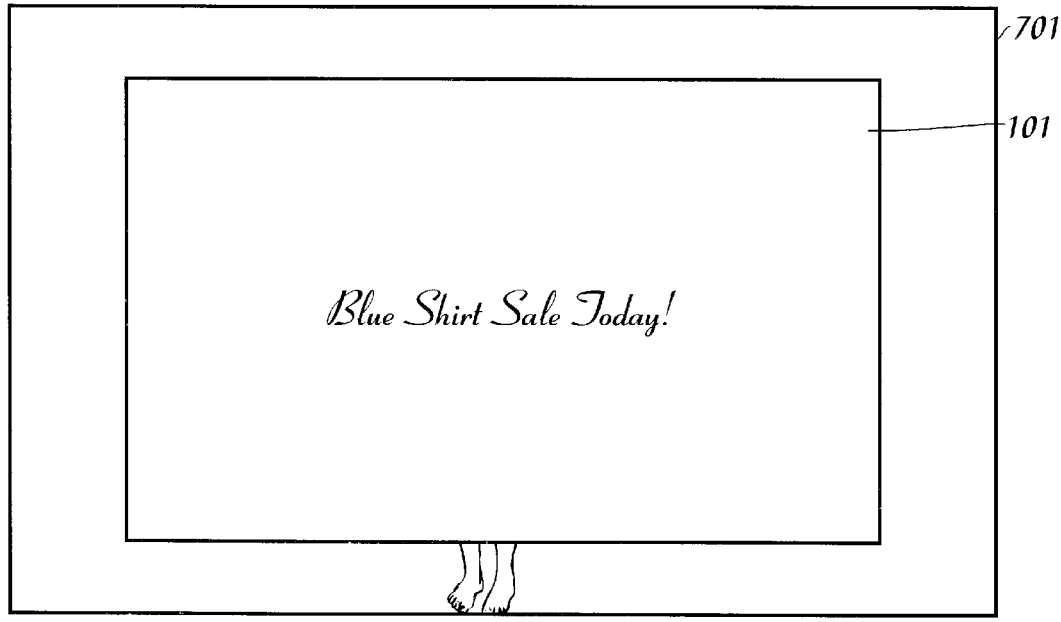

As an example, referring to FIG. 7B there is shown a front view of the system in FIG. 7A where a viewer 702 sees himself/herself through the transparent screen 101 within the mirror 701. FIG. 7C illustrates the system when an image is projected onto screen 101 so that viewer 702 now sees the projected image.

Figure 7D:
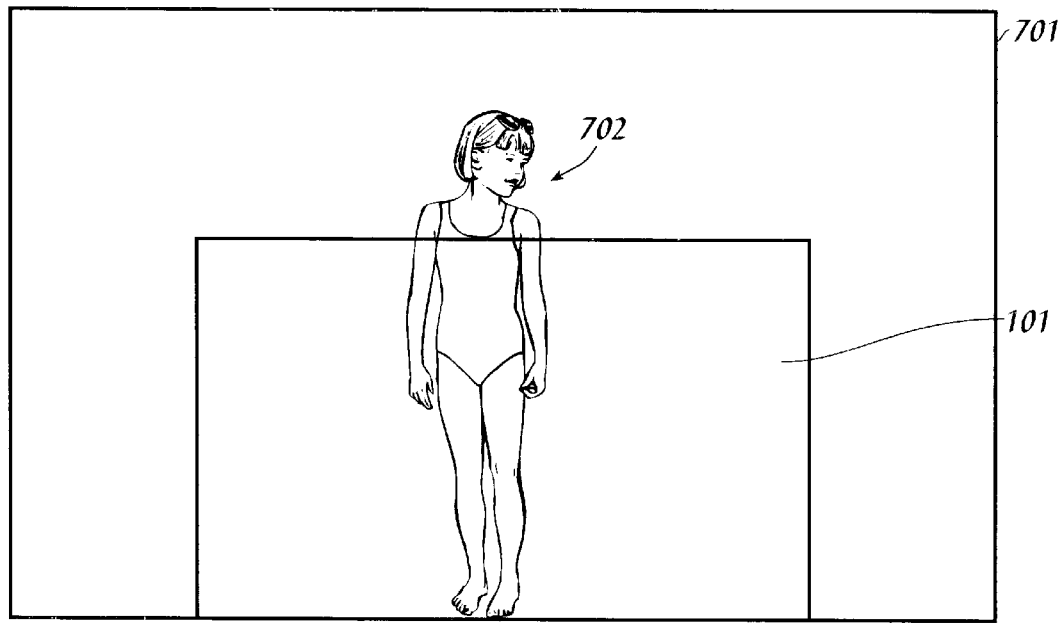
Figure 7E:
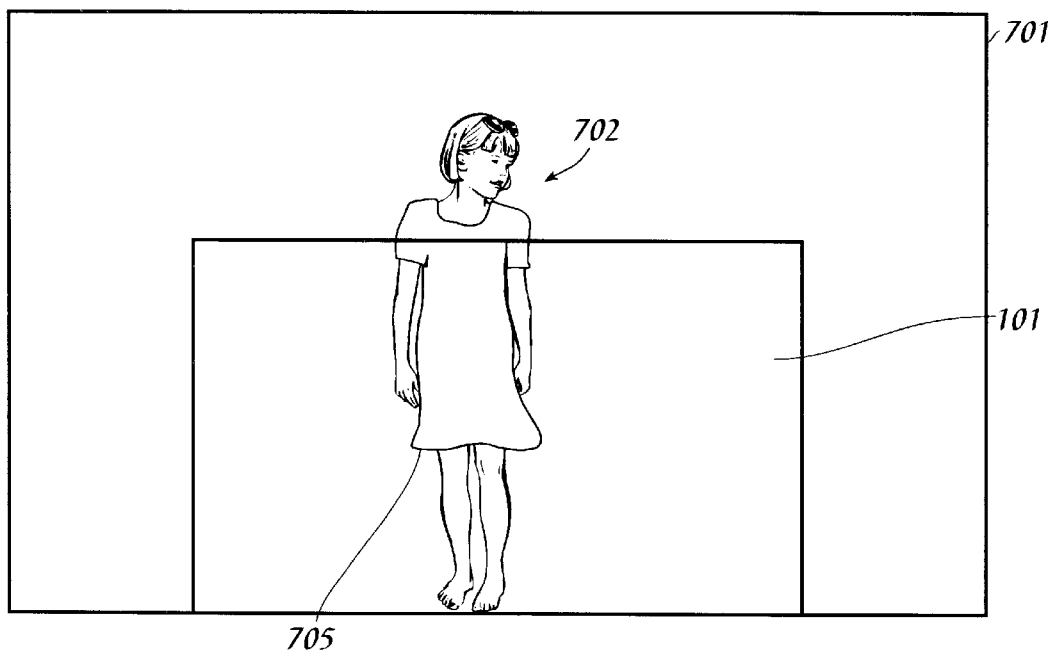

FIGS. 7D and 7E illustrate an alternative embodiment of the present invention where screen 101 is positioned in front of mirror 701 so that when the screen 101 is in a transparent state, with no image being projected, the viewer 702 sees himself/herself in mirror 701. FIG. 7E illustrates the projection of a clothing article, such as a dress 705, projected onto screen 101 so that viewer 702, who sees himself/herself partially in mirror 701, can view himself/herself in a virtual image with the dress.

Alternatively, a film implementing the properties of screen 101 could be attached directly onto the glass surface of the mirror.

Furthermore, screen 101 could be positioned so that it is incognito and thus does not present an image to be reflected in mirror 701. Then, when an image is projected onto screen 101 (maybe in reverse), it will be reflected by mirror 701, and viewed by persons.

Note, all of the projectors described herein could operate with a shutter implemented as described with respect to FIG. 8. Also, any projector with a shutter can operate in this manner, without the need for screen 101.

Although the present invention and its advantages have been described in detail, it should be understood that various changes, substitutions and alterations can be made herein without departing from the spirit and scope of the invention as defined by the appended claims.

What is claimed is:

1. An image projection system comprising:
    a screen;
    a projector for projecting an image; and
    a shutter for permitting passage of the image from the projector to the screen, the shutter automatically opening upon receipt of a video image by the projector, and automatically closing when the video image is not received by the projector.

2. The system as recited in claim 1, wherein the screen further comprises a material that reflects the image when it is projected at an angle relative to the screen.

3. The system as recited in claim 1, wherein the screen further comprises a material that is substantially transparent when the screen is configured to allow the object to be viewed through the screen, and wherein the material is substantially translucent when the image is projected upon it.

\* \* \* \* \*